(12) United States Patent
Usui et al.

(10) Patent No.: US 6,197,245 B1
(45) Date of Patent: *Mar. 6, 2001

(54) PROCESS FOR PRODUCING HOLLOW RESIN MOLDED ARTICLE

(75) Inventors: Nobuhiro Usui, Takatsuki; Akihiro Furuta, Ibaraki; Toru Inoue, Anjo, all of (JP)

(73) Assignee: Sumitomo Chemical Company, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,671

(22) Filed: Aug. 4, 1998

(30) Foreign Application Priority Data

Aug. 4, 1997 (JP) .................................................. 9-208957

(51) Int. Cl.⁷ ............................ B29D 22/00; B29C 49/30

(52) U.S. Cl. ............................................. 264/572; 249/82

(58) Field of Search ................................ 264/572; 249/82

(56) References Cited

U.S. PATENT DOCUMENTS

| 5,277,865 | * | 1/1994 | Hara et al. ............................ 264/572 |
| 5,534,216 |   | 7/1996 | Kamiyama . |
| 5,656,234 | * | 8/1997 | Kaneshi et al. ...................... 264/572 |
| 5,849,377 | * | 12/1998 | Horikoshi et al. ................... 264/572 |
| 5,885,518 | * | 3/1999 | Hendry ................................. 264/572 |

FOREIGN PATENT DOCUMENTS

| 0 529 080 A1 | 3/1993 | (EP) . |
| 0 624 447 A1 | 11/1994 | (EP) . |
| 0 791 447 A1 | 8/1997 | (EP) . |
| 1-168425 | * 7/1989 | (JP) . |
| 03274120 | 5/1991 | (JP) . |
| 0459211A | 2/1992 | (JP) . |
| 04212822A | 8/1992 | (JP) . |
| 0564829A | 3/1993 | (JP) . |
| 05084786 | 4/1993 | (JP) . |
| 05162161 | 6/1993 | (JP) . |
| 05301262A | 11/1993 | (JP) . |
| 06182860 | 7/1994 | (JP) . |
| 06315970A | 11/1994 | (JP) . |
| 07144336A | 6/1995 | (JP) . |

OTHER PUBLICATIONS

922 Modern Plastics International 23(1993) Mar., No. 3, Lausanne, CH, "Mold automation saves more material than standard gas–assist".

* cited by examiner

Primary Examiner—Leo B. Tentoni
Assistant Examiner—Suzanne E. McDowell
(74) Attorney, Agent, or Firm—Pillsbury Madison & Sutro LLP

(57) ABSTRACT

According to the present invention, a hollow molded article of high quality can be produced by conducting the following steps of:

- providing a small-sized molding machine comprising a mold having a pair of mold halves wherein at least one of the mold halves comprises a body and a slidable block;
- supplying a resin in an unsolidified state between the mold halves to fill a mold cavity having a first clearance with the resin;
- supplying a pressured fluid into the resin lying between the mold surfaces;
- moving the slidable block from a first position to a second position;
- opening the mold until a cavity clearance becomes a second clearance which is larger than the first clearance; and
- opening the mold to take out the hollow molded article.

19 Claims, 2 Drawing Sheets

PROCESS FOR PRODUCING HOLLOW RESIN MOLDED ARTICLE

BACKGROUND OF THE INVENTION

1. Field of the Invention

The present invention relates to a process for producing a resin molded article having a hollow space inside, the resin molded article, hereinafter, being referred to as a "hollow molded article".

2. Description of the Related Art

Japanese unexamined patent publication Nos. Hei 4-212822 and Hei 7-144336 disclose a process for producing a hollow molded article utilizing an injection molding method having a core retracting system. In this process, a molten resin is injected with a high pressure into a cavity which is completely closed with a predetermined clearance. After filling the cavity with the resin, a movable core is retracted to expand the cavity while injecting a high-pressured gas into the molten resin. Consequently, a hollow space is formed in a resin substrate. However, such a method has been problematic in that a sink mark and a blister have been caused in a part of the hollow molded article in the vicinity of the hollow space and the appearance of the hollow molded article has been deteriorated because of the difference in a cooling speed of the resin and in a pressure applied to the resin between a part near to the hollow space and apart far from the hollow space. Additionally, there has been another problem that when molding of the hollow molded article and laminating of a skin material, such as one having a cushion layer and one having hair such as a carpet, onto a surface of the hollow molded article are carried out simultaneously, the cushion layer is crushed and the hair is laid in different degrees between the part near to the hollow space and the part far from the hollow space and the appearance of the hollow molded article is deteriorated.

SUMMARY OF THE INVENTION

The object of the present invention is to solve the problems of the conventional processes. Namely, one object of the present invention is to provide a process for producing a hollow molded article which has a hollow space extending throughout its inside and in which neither the sink mark nor blister is caused in the part near to the hollow space. Another object of the present invention is to provide a process for producing a hollow molded article having good appearance without causing differences both in a residual degree of the cushion layer and in a degree of hair-lying between the part near to the hollow space and the part far from the hollow space, even when a hollow molded article on which the skin material having the cushion layer and the hair is laminated is produced.

According to the present invention, there is provided a process for producing a hollow molded article comprising the following steps of:

Step (A) providing a molding machine comprising a mold including a first mold half and a second mold half, wherein the first mold half has a first mold surface, the second mold half has a second mold surface, the mold surfaces together define a cavity, at least one of the mold halves can move so that the mold surfaces approach and go away from each other, at least one of the mold halves comprises a body and a slidable block, the mold surface of the mold half comprising the body and the slidable block comprises a surface of the body and a surface of the slidable block, the slidable block can move from a first position to a second position, the movement of the slidable block from the first position to the second position expands the cavity;

Step (B) supplying resin in an unsolidified state between the first mold surface and the second mold surface to fill the cavity with the resin, wherein the cavity has a first clearance;

Step (C) supplying pressurized fluid into the resin lying between the mold surfaces;

Step (D) moving the slidable block from the first position to the second position;

Step (E) opening the mold until a cavity clearance becomes a second clearance which is larger than the first clearance; and Step (F) opening the mold to take out the hollow molded article.

In one embodiment of the present invention, in Step (B), the resin in the unsolidified state may be supplied between the first mold half and the second mold half facing with each other with a clearance larger than the first clearance, and at least one mold half may be moved to press and spread the resin to fill the cavity with the same. In another embodiment of the present invention, Step (E) may be commenced at the same time when or after Step (D) is commenced. In still another embodiment of the present invention, Step (D) may be commenced after Step (E) is commenced. In yet another embodiment of the present invention, Step (D) may be commenced at the same time when or after Step (C) is commenced. In yet another embodiment of the present invention, Step (E) may be commenced at the same time when Step (C) is commenced. In yet another embodiment of the present invention, Step (C) may be commenced after Step (B) is commenced. In yet another embodiment of the present invention, Step (D) may be commenced after Step (B) is completed. In yet another embodiment of the present invention, Step (E) may be commenced after Step (B) is completed. In yet another embodiment, a further step of changing a pressure applied to the resin may be carried out after Step (B) is completed and before Step (E) is commenced. In yet another embodiment of the present invention, Step (C) may be commenced at the same time when or after the step of changing the pressure is commenced. In yet another embodiment, the step of changing the pressure is carried out after Step (B) is completed and after Step (E) is commenced, and Step (D) is commenced at the same time when or after the step of changing the pressure is commenced. In yet another embodiment of the present invention, in Step (B), supplying the resin is commenced at a time when the slidable block is located at the first position, and the mold surface of the slidable block existing at the first position is depressed below the surface of the body adjacent to the slidable block. In yet another embodiment of the present invention, a further step of supplying a skin material between the first mold surface and the second mold surface is carried out before Step (B) is commenced.

Other objects, features, and advantages of this invention will be apparent from a consideration of the following detailed description thereof in conjunction with the accompanying drawings.

DESCRIPTION OF THE PREFERRED EMBODIMENTS

Figure 1:
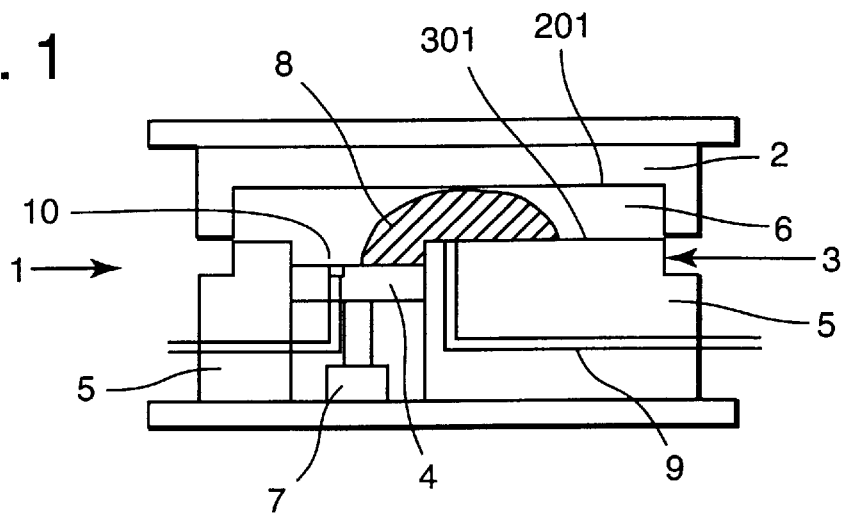
FIG. 1 illustrates a scene in which resin is supplied between mold surfaces.

FIG. 1 schematically illustrates one example of the molding machine which is used in the process of the present invention. The molding machine comprises the mold (1) including the first mold half (2) and the second mold half (3). Referring to FIG. 1, one example of the mold including a female mold half as the first mold half (2) and a male mold half as the second mold half (3) is shown. The mold surface of the first mold half (the first mold surface, 201) and the mold surface of the second mold half (the second mold surface, 301) can together define the cavity (6). The configuration of the mold surfaces is designed depending upon the shape of the desired hollow molded article. The molding machine may have a driving device (a clamping device) which can move at least one mold half in a linear direction so that the mold surfaces can approach and go away from each other. The linear direction is not necessarily restricted to a vertical direction, a substantially vertical direction, a horizontal direction or a substantially horizontal direction. It may be suitably determined depending upon a situation.

At least one mold half includes the body (5) and the slidable block (4). The mold surface of the mold half including the body and the slidable block comprises at least a part of the surface of the body and at least a part of the surface of the slidable block. Although the slidable block is often provided in one mold half, it may be provided in both mold halves. One mold half may include a plurality of slidable blocks depending upon the shape of the desired hollow molded article. At least a part of the surface of the slidable block always faces and substantially contacts with at least a part of the surface of the body during the operation of the process of the present invention. Here, "the state in which the surface of the slidable block faces and substantially contacts with the surface of the body" means a state in which the slidable block is located close to the body so that the unsolidified resin does not leak through a gap between the surface of the slidable block and that of the body, and of course includes a state in which the slidable block tightly contacts with the body. The slidable block can move from the first position to the second position with at least a part of its surface substantially contacting with at least a part of the surface of the body. Both the first position and the second position of the slidable block are relative positions based on the position of the body which constitutes the mold half with the slidable block. The movement of the slidable block from the first position to the second position can expand the cavity and can increase the volume of the cavity. The concrete first position and second position, respectively, may be determined depending upon the size and the shape of the desired molded article and the position, the size and the shape of the desired hollow space. When a plurality of slidable blocks is provided, the first position and the second position of the slidable block, respectively, may be determined individually for each slidable block. The slidable block may be connected with a conventional driving means (7) such as a hydraulic cylinder and an air cylinder so as to move at least from the first position to the second position.

The position in the mold half where the slidable block is provided is determined depending upon the shape of the desired hollow molded article. The configuration of the surface of the slidable block which constitutes a part of the mold surface of the mold half is designed depending upon the shape of the desired hollow molded article. When a plurality of slidable blocks is provided, the shape of each slidable block can be individually determined.

The process of the present invention has a step of supplying the resin (8) in the unsolidified state between the mold surfaces (201, 301) of the first mold half (2) and the second mold half (3) to fill the cavity, which has a cavity clearance of the first clearance, with the resin. This step is referred to as "Step (B)".

Step (B) can be carried out, mainly, by two ways. In the first way, the resin in the unsolidified state is injected into the cavity defined by the first mold half and the second mold half which are held with the first clearance therebetween. In the second way, the resin in the unsolidified state is supplied between the first mold half and the second mold half which face each other with a clearance larger than the first clearance therebetween, and the resin is pressed and spread by the movement of moving at least one mold half in the mold-closing direction, in other words, by a mold-clamping, to fill the cavity with the resin. Since the former method requires a high clamping force and a large molding machine, the latter method is preferable. In any way, it is preferred that the resin start to be supplied when the slidable block is located at the first position.

In the present invention, "filling the cavity with the resin" means making a state in which whole or substantially whole mold surfaces, which define the cavity, contact with the resin. Therefore, it means substantially completely filling the cavity with the resin while leaving a little void between the mold surfaces and the resin, as well as completely filling the cavity with the resin. It is preferred to fill the cavity with the resin so that there is little void which contacts with the mold surfaces in the cavity. Additionally, the above-mentioned "filling the cavity with the resin" also means making the surface of the resin having a hollow space inside contact with the whole or substantially whole mold surfaces while simultaneously injecting the compressed gas into the resin, as well as filling the cavity with only the resin.

In the aforementioned second method, the mold-clamping may be commenced either after the completion of supplying the resin or in the middle of supplying the resin. Alternatively, the mold-clamping may be commenced before the beginning of supplying resin. The mold-clamping may be completed either at the same time when or after supplying the resin is completed.

A method for supplying the resin between the mold halves is not particularly limited. In order to prevent the resin from being excessively cooled before the beginning of supplying the pressurized fluid, it is preferred that the resin be directly supplied between the mold surfaces via a resin path (9) provided in at least one of the mold halves. The resin also may be supplied between the mold surfaces using a resin supplying machine which has a nozzle for injecting the resin and which is located outside the molding machine. This method is adopted when the mold-clamping is conducted after the completion of supplying resin.

The process of the present invention has a step of supplying the pressurized fluid into the resin supplied between the mold surfaces of the mold halves. This step is referred to as "Step (C)".

The pressurized fluid may be a material which is pressured and can flow and can be supplied into the resin to form a hollow space inside the same. The pressurized fluid may be a liquid which can be easily vaporized by heat of the resin into which the liquid is supplied, such as a liquefied carbon dioxide gas and water, as well as a gas. Alternatively, it may be granular or powdered solid, such as a foamable bead, which can easily generate gas due to, for example, decomposition by heat of the resin into which the solid is supplied. Normally, the pressurized fluid may be compressed gas such as compressed air, compressed nitrogen and compressed carbon dioxide. The injection pressure of the pressurized fluid may be set depending upon molding conditions, but it preferably is not less than about 1 kgf/cm$^2$ and less than about 10 kgf/cm$^2$. Especially, compressed air having a pressure of not less than about 1 kgf/cm$^2$ and less than about 10 kgf/cm$^2$ is preferably employed. The injection pressure of the pressurized fluid may be either constant during injection of the same or changed in the middle of injection.

In Step (C), the timing to commence supplying the pressurized fluid can be selected from a time after the resin which was supplied between the mold halves has reached a fluid-supply-opening (10) provided to at least one mold half and when it is possible both to supply the pressurized fluid into the resin and to form the hollow space (11) in the resin by the pressurized fluid. Therefore, Step (C) may be commenced in the middle of Step (B). However, it is preferred that the supply of the pressurized fluid be commenced between the completion of filling the cavity with the resin and the beginning of retracting the slidable block. Especially, the supply of the pressurized fluid is preferably commenced within a relatively short time, specifically within about 15 seconds, from the completion of filling the cavity with the resin. The pressurized fluid may be supplied continuously or intermittently until the resin solidifies. Alternatively, it is also possible that the supply of the pressurized fluid is stopped after the hollow space has been formed in the resin and then the resin is solidified while maintaining the pressure of the pressurized fluid in the hollow space.

The pressurized fluid is not necessarily supplied into the resin at only one point, and may be supplied at multiple points depending upon the shape and the size of the desired hollow molded article. When the fluid-supply-opening is provided in the cavity surface of the slidable block as illustrated in FIG. 1, the hollow space can be efficiently formed and the hollow molded article having good appearance can be produced.

When the compressed gas is employed as the pressurized fluid, it is possible to eject the compressed gas from the resin to let it flow through the hollow space formed in parallel with supplying the compressed gas into the resin, whereby cooling of the resin is promoted and the molding cycle is shortened.

When the pressurized fluid is supplied into the resin through multiple fluid-supply-openings, it is possible that the pressurized fluid continues to be supplied through at least one fluid-supply-opening and it is ejected through at least one of the other fluid-supply-openings. Alternatively, it is also possible that a mold which has a fluid-eject-opening only for ejecting the pressurized fluid is used and the pressurized fluid is ejected from the resin through the fluid-eject-opening while supplying the pressurized fluid into the resin through the fluid-supply-opening. It is still also possible that the pressurized fluid is alternately repeatedly supplied and ejected through a common opening. However, a method for ejecting the pressurized fluid is not restricted to the above exemplified methods. The ejection of the pressurized fluid from the resin can be commenced at any suitable time after the beginning of supplying the pressurized fluid. For example, it may be commenced substantially at the same time when the supply of the pressurized fluid begins. The ejection of the pressurized fluid may be continued even after the supply thereof has been completed.

The process of the present invention has a step of moving the slidable block from the first position to the second position. This step is referred to as "Step (D)". The cavity defined by the first mold half and the second mold half is expanded by the movement of the slidable block from the first position to the second position.

The movement of the slidable block may be commenced after supplying the resin between the mold halves has begun. The concrete timing to commence the movement is set according to the size and the shape of the desired hollow molded article, the size, the shape and the position of the desired hollow space, the pressure of the pressurized fluid, the mold temperature, the type and the temperature of the resin used, the size and the stroke of the slidable block, and the like. For example, the slidable block may commence to be retracted in the middle of Step (B). Alternatively, the slidable block may begin to retract immediately after the cavity having the first clearance has been filled with the resin, in other words, immediately after the completion of Step (B). It is also possible that the slidable block begins to retract after a certain time has passed after the completion of Step (B). Concretely, it is preferred that the slidable block begins to retract within about 15 seconds after the completion of filling the cavity having the first clearance with the resin. Although the supply of the pressurized fluid and the retraction of the slidable block may be commenced at the same time or substantially at the same time, the supply of the pressurized fluid into the resin is preferably commenced prior to the retraction of the slidable block. Normally, the supply of the pressurized fluid is continued during the retraction of the slidable block.

The movement of the slidable block, for example, can be controlled as follows. The slidable block which is connected with a cylinder such as a hydraulic cylinder and an air cylinder and which has been held at the first position can be moved to the second position by the operation of the cylinder at a predetermined time. Alternatively, the slidable block which has been held at the first position with a stopper may be retracted to the second position by both releasing the stopper and applying a pressure on the surface of the slidable block facing the cavity. When the slidable block is held at the first position by the stopper, the stopper can be easily released by decreasing, at the beginning of retracting the slidable block, a mold clamping force to reduce the pressure which is applied to the slidable block. At this time, since the pressure which is applied to the resin is also reduced, the hollow space can easily formed.

By taking conditions such as the desired size of the hollow space, the injection pressure of the pressurized fluid, the mold temperature, the type and the temperature of the resin supplied, the size and the stroke of the slidable block into consideration, a moving speed of the slidable block can be determined.

The process of the present invention has a step of opening the mold until the cavity clearance becomes the second clearance which is larger than the first clearance. This step is referred to as "Step (E)".

In Step (E), the second clearance substantially corresponds to the thickness of the desired hollow molded article. The opening of the mold in Step (E) is conducted by the movement of at least one mold half. Step (E) may be commenced after the beginning of Step (B). A concrete timing to open the mold in Step (E) may be determined according to various molding conditions, the pressure of the pressurized fluid, the stroke of the mold halves and the like. For example, Step (E) may be commenced in the middle of Step (B). Step (E) also may be commenced immediately after Step (B). It is also possible that Step (E) may be commenced after a certain time has passed after the completion of Step (B). Step (E) also may be commenced after the beginning of Step (C). At least a part of Step (E) may be conducted with at least a part of Step (C). At least a part of Step (E) also may be performed with at least a part of Step (D). Although Step (E) may be completed before the beginning of Step (D), it is preferably commenced after the completion of Step (D). Especially, Step (E) is preferably commenced within a relatively short time, specifically within about 15 seconds, from the completion of Step (B). Performing Step (E) forms the hollow space approximately throughout the inside of the hollow molded article to uniformize the pressure which is applied to the entire hollow molded article, and produces the hollow molded article having good appearance.

As mentioned above, the order of the beginning of Steps (C), (D) and (E) is arbitrary and a concrete order is suitably determined depending upon the size of the desired hollow molded article, the molding conditions, the pressure of the pressurized fluid, the size and the stroke of the slidable block, the stroke of the mold halves in Step (E) and the like. However, it is preferred that Step (C) is commenced within a relatively short time, specifically within about 15 seconds, from the completion of Step (B), Step (D) is commenced at the same time when Step (C) has been commenced or within a relatively short time after the beginning of Step (C), and Step (E) is commenced at the same time when Step (D) has been commenced or within a relatively short time after the beginning of Step (D).

In the above-mentioned process, the pressure which is applied to the resin can be changed by changing the clamping force between the completion of Step (B) and the beginning of Step (E). For example, let P1 be the clamping force at the completion of Step (B). It is preferred that Steps (C) and (D) be commenced at the same time when or after the clamping force has been reduced from P1 to P2. In this case, Step (E) is conducted after the completion of Steps (C) and (D). Although the reduction of the clamping force may be done after the completion of Step (B), it is preferably conducted within a relatively short time, normally within about 15 seconds, after the completion of Step (B).

After the desired hollow space (11) has been formed in the resin and at a time when the resin has moderately solidified, a step of opening the mold to take the hollow molded article (12) out. This step is referred to as "Step (F)".

A variety of resins, such as thermoplastic resins, thermoplastic elastomers and thermosetting resins, which are employed in conventional molding methods such as injection molding, injection compression molding, compression molding, extrusion molding and stamping molding can be utilized in the process of the present invention. For example, a conventional thermoplastic resin such as polyolefin resins, e.g., polyethylene and polypropylene, polystyrene, polycarbonate, acrylonitrile-styrene-butadiene block copolymer and polyamide; a thermoplastic elastomer such as ethylene-propylene block copolymer and ethylene-butadiene block copolymer; and a polymer alloy thereof can be used. The resin may contain a variety of conventional additives such as a pigment, a lubricant, an antistatic agent and an antioxidant.

For the purpose of decorating the surface of the hollow molded article and providing a cushion property to the hollow molded article, a skin material may be provided onto the surface of the hollow molded article. In the process described above, the hollow molded article onto whose surface the skin material is stuck can be produced by supplying the skin material between the mold halves before Step (B) and then performing the aforementioned steps. In this modified process, the resin is normally supplied to a rear side of a designed surface of the skin material. Although the skin material can be chosen depending upon use thereof, it may be paper, woven fabric, non-woven fabric, knit, a net such as wire gauze, a film or a sheet made of thermoplastic resin or thermoplastic elastomer. The skin material may have decorations such as print and an uneven pattern, e.g., an grain pattern on its surface. The skin material may be lined with a foamed sheet made of polypropylene, polyethylene, polyvinyl chloride, polyurethane and the like. The skin material may be lined with a thermoplastic elastomer sheet in order to protect the skin material from heat of the molten resin and a clamping pressure or in order to improve adhesiveness of the resin with the skin material.

Conditions such as the temperature of the resin to be supplied, the cavity clearance which is defined when the resin is supplied, a mold clamping speed, the mold temperature may be determined according to the type of the resin to be used, the size and the shape of the mold, the type of the skin material and the like.

According to the process of the present invention, the hollow molded article having a hollow space extending approximately throughout its inside and good appearance without having any sink mark and blister can be readily produced by using the simple and inexpensive molding machine. The obtained hollow molded article can be suitably employed as interior parts of an automobile such as an instrument panel, a door trim, a seat back, a console box and a deck board, and various panels.

EXAMPLES

The following Examples are preferred embodiments of the present invention, but they do not limit the scope of the present invention.

Example 1

A hollow molded article was produced by using a molding machine comprising a mold having a pair of a male mold half and a female mold half which could be vertically moved. The cross section of the molding machine is schematically illustrated in FIG. 1. The male mold half had a body and a slidable block. A projective shape of a cavity onto a imaginary plane being perpendicular to the mold closing direction was 320 mm long and 780 mm wide. A projective shape of the slidable block onto that imaginary plane was 80 mm long and 740 mm wide. The top of the slidable block had a flat surface whose shape was identical to the projective shape of the slidable block.

Positions where the slidable block was located with its top being 3.5 mm below and 17.5 mm below the mold surface of the body which was adjacent to the slidable block were, respectively, defined as the first position and the second position. Hence, a stroke of the slidable block was 14 mm. The slidable block could be moved in a vertical direction by a hydraulic cylinder.

A compressed air of 6 kgf/cm$^2$ was used as a pressurized fluid. The compressed gas was fed through fine openings (fluid-supply-openings) provided in a top surface of a cylindrical sintered copper 10 mm in diameter and 10 mm long. Three sintered coppers were buried in the slidable block so that their top surfaces could make a plane together with the top surface of the slidable block. The rear end of each sintered copper was connected with a gas path which led to a compressed gas supplying machine.

Figure 2:
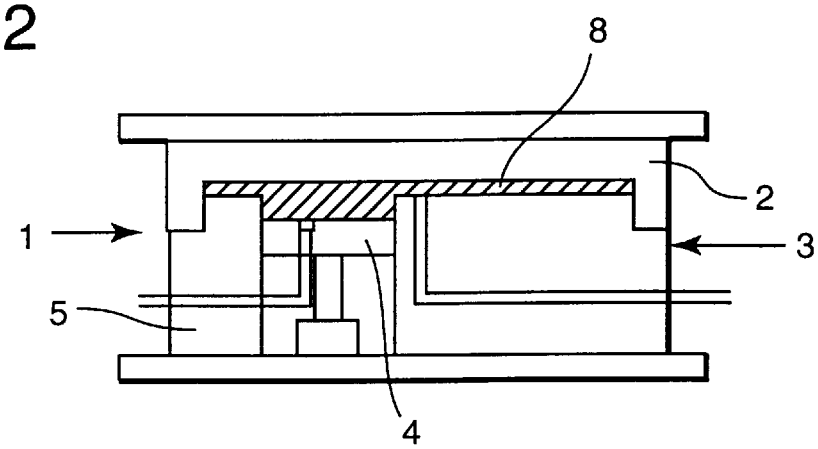
FIG. 2 illustrates a scene in which a cavity has been filled with the resin.

When the clearance between the body of the male mold half and the female mold half was 30 mm, a molten polypropylene resin (Sumitomo Noblen BTA51E1 manufactured by Sumitomo Chemical Co., Ltd.; temperature: 210° C.) was supplied between the mold surfaces from a resin path provided in the male mold half. Almost at the same time when the predetermined amount of the resin completed to be supplied, the female mold was lowered until the clearance defined between the body and the female mold half became 3.5 mm to close the mold with a maximum clamping force of 100 tonf. Consequently, the resin was flowed to fill the cavity with the resin. See FIG. 2.

Figure 3:
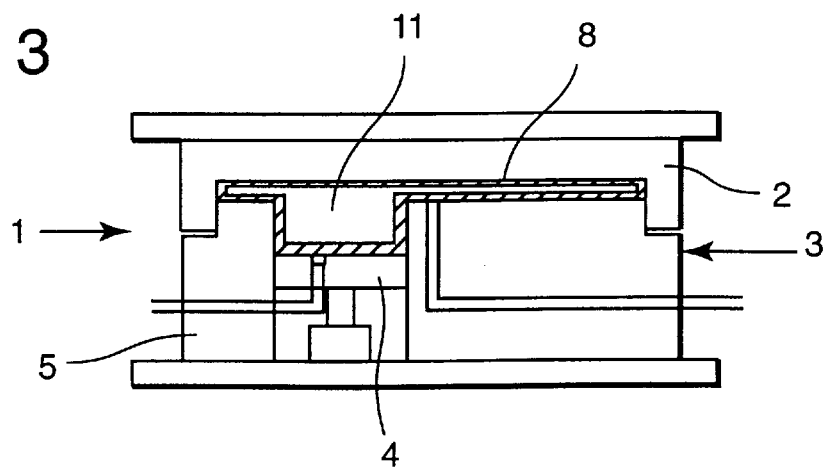
FIG. 3 illustrates a scene in which a hollow space has been formed in the resin.
Figure 4A:
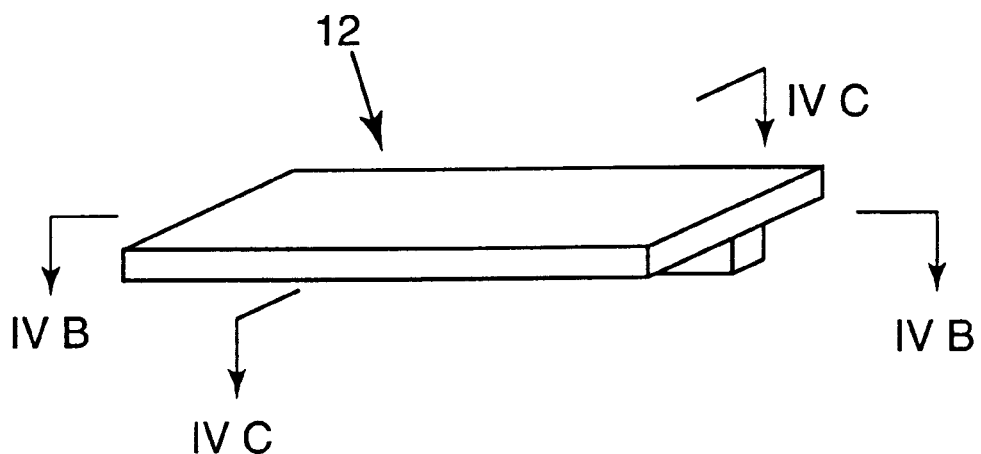
FIG. 4A is a schematic perspective view of a hollow molded article produced in Example 1.
Figure 4B:
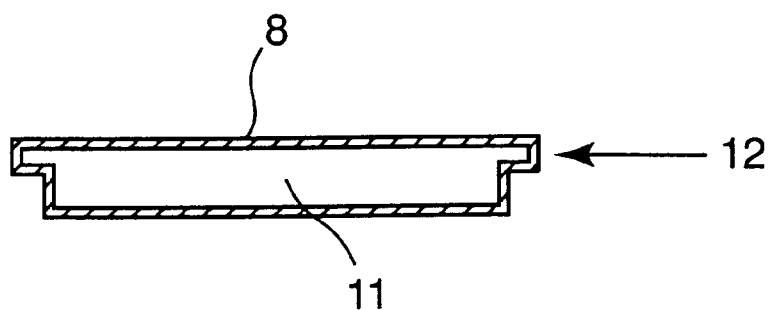
FIG. 4B is a cross section of the hollow molded article illustrated in FIG. 4A taken along the IV B—IV B line.
Figure 4C:
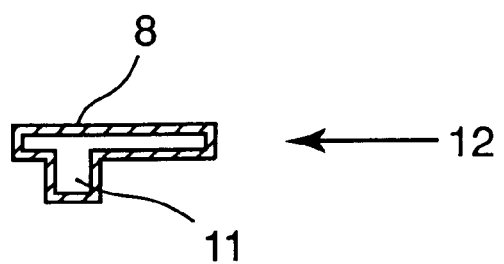
FIG. 4C is a cross section of the molded article illustrated in FIG. 4A taken along the IV C—IV C line.

The clamping force was maintained for 2 seconds at 100 tonf, followed by being reduced to 30 tonf. At the same time, injection of the compressed gas through the fluid-supply-openings and the movement of the slidable block were commenced. One second after the beginning of the movement of the slidable block, the female mold half was lifted to make the clearance between the body of the male mold half and the female mold half 10 mm. While the injection of the compressed air being continued, the resin was cooled to be solidified. See FIG. 3. After stopping the injection of the compressed gas, the mold was opened and a hollow molded article was taken out.

A hollow space was formed throughout the hollow molded article obtained. The hollow molded article had good appearance without having any sink mark and blister.

Example 2

A hollow molded article in which a carpet was laminated on a resin substrate was produced according to a similar manner as described in Example 1 except that the carpet was supplied between the mold halves before the molten polypropylene resin was supplied between the mold halves.

The hollow space was formed throughout the hollow molded article obtained. The hollow molded article had good appearance without having any sink mark and blister. The hair of the carpet was uniformly pressed.

What is claimed is:

1. A process for producing a hollow molded article comprising:
    supplying a resin in an unsolidified state between a first mold surface and second mold surface to a mold to fill a cavity with the resin, wherein the mold includes a first mold half and a second mold half, the first mold half has a first mold surface, the second mold half has a second mold surface, the mold surfaces together define the cavity, at least one of the mold halves can move so that the mold surfaces approach and go away from each other, at least one of the mold halves comprises a body and a slidable block, the mold surface of the mold half comprising the body and the slidable block comprises a surface of the body and a surface of the slidable block, the slidable block can move from a first position to a second position, the movement of the slidable block from the first position to the second position expands the cavity, the surface of the slidable block being at a greater distance from the other mold half surface than the surface of the body, and the cavity has a first clearance;
    supplying a pressurized fluid into the resin lying between the mold surfaces:
    moving the slidable block from a first position to a second position;
    opening the mold until a cavity clearance becomes a second clearance which is larger than the first clearance; and
    opening the mold to take out the hollow molded article.

2. A process according to claim 1, wherein, during said supplying the resin in the unsolidified state is supplied between the first mold half and the second mold half facing with each other with a clearance larger than the first clearance, and at least one mold half is moved to press and spread the resin to fill the cavity with the same.

3. A process according to claim 1, wherein opening the mold is commenced at the same time when or after moving the slidable block is commenced.

4. A process according to claim 1, wherein moving the slidable block is commenced after commencing opening the mold.

5. A process according to claim 1, wherein moving the slidable block is commenced at the same time when or after commencing supplying the pressurized fluid.

6. A process according to claim 1, wherein opening the mold is commenced at the same time when commencing supplying the pressurized fluid.

7. A process according to claim 1, wherein supplying the pressurized fluid is commenced after the beginning of supplying the unsolidified resin in the unsolidified state.

8. A process according to claim 1, wherein moving the slidable block is commenced after the completion the supplying of the resin in the unsolidified state.

9. A process according to claim 1, wherein opening the mold is commenced after the completing of the supplying of one resin in the unsolidified state.

10. A process according to claim 1, 2, or 3, comprising a further step of changing a pressure which is applied to the resin, the step being conducted between completing of the supplying of the resin and the beginning to open the mold.

11. A process according to claim 1, comprising a further step of changing a pressure which is applied to the resin wherein the step is conducted between completing the supply of the resin and beginning to open the mold and wherein supply the pressurized fluid is commenced at the same time when or after the step of changing the pressure is commenced.

12. A process according to claim 1, further comprising changing the pressure which is applied to the resin between completing of supplying the resin and beginning opening the mold and wherein moving the slidable block is commenced at the same time when or after the step of changing the pressure is commenced.

13. A process as in claim 1 further comprising supplying of a skin material between the first mold surface and the second mold surface before beginning supplying the resin.

14. A process as in claim 1, wherein the pressurized fluid is compressed gas.

15. A process as in claim 1, wherein the pressurized fluid has a pressure of not less than about 1 kgf/cm$^2$ and less than about 10 kgf/cm$^2$.

16. A process as in claim 1, wherein the pressurized fluid is compressed air.

17. A process according to claim 1, comprising a further step of ejecting the pressurized fluid which is a compressed gas from the inside of the resin, the step being conducted at the same time when or after the compressed gas has commenced to be supplied.

18. A process as in claim 1, comprising a further step of supplying a skin material between the first mold surface and the second mold surface, the step being conducted before the beginning of Step (B).

19. A process according to claim 1, wherein the pressurized fluid is supplied through a fluid-supply-opening provided in the cavity surface of the slidable block.

* * * * *